US012515227B2

(12) United States Patent
Motadel et al.

(10) Patent No.: US 12,515,227 B2
(45) Date of Patent: Jan. 6, 2026

(54) PIPETTE TIP SUPPORT CARD BUNDLES

(71) Applicant: Xcaliber Sciences, Inc., San Diego, CA (US)

(72) Inventors: Arta Motadel, Rancho Santa Fe, CA (US); Pete Blaszczak, Ramona, CA (US); Juan Martin Mendez Padilla, Tijuana (MX)

(73) Assignee: XCALIBER Sciences, Inc., San Diego, CA (US)

(*) Notice: Subject to any disclaimer, the term of this patent is extended or adjusted under 35 U.S.C. 154(b) by 0 days.

(21) Appl. No.: 18/620,627

(22) Filed: Mar. 28, 2024

(65) Prior Publication Data

US 2025/0214085 A1 Jul. 3, 2025

Related U.S. Application Data

(60) Provisional application No. 63/567,766, filed on Mar. 20, 2024, provisional application No. 63/614,919, filed on Dec. 27, 2023.

(51) Int. Cl.
*B01L 9/00* (2006.01)

(52) U.S. Cl.
CPC ......... *B01L 9/543* (2013.01); *B01L 2200/025* (2013.01); *B01L 2300/045* (2013.01)

(58) Field of Classification Search
None
See application file for complete search history.

(56) References Cited

U.S. PATENT DOCUMENTS 3,379,315 A * 4/1968 Broadwin ............. B01L 3/0217 422/933
6,019,225 A * 2/2000 Kalmakis ................ B01L 9/543 211/74
6,286,678 B1 * 9/2001 Petrek ..................... B01L 9/543 422/526
6,328,933 B1 * 12/2001 Labriola ................. B01L 9/543 211/74
10,029,261 B2 * 7/2018 Motadel .................. B01L 9/543
11,059,047 B2 * 7/2021 Motadel ............... B65D 25/108
2013/0108522 A1 * 5/2013 Cohen ..................... B01L 9/543 422/552

* cited by examiner

*Primary Examiner* — Brian R Gordon
(74) *Attorney, Agent, or Firm* — Manuel de la Cerra

(57) ABSTRACT

An interleaved support card bundle with two pipette tip support cards, the first support card with a first top surface that contains a first plurality of pipette tip support holes. A first plurality of pipette tips is seated in the support holes, and those tips extend away from the first top surface. The bundle also has second support card with a similar construction as that of the first support card. The first top surface is parallel to the second top surface, and the first plurality of pipette tips extends towards the second top surface. Likewise, the second plurality of pipette tips extends towards the first top surface. The pipette tips interleave with each other in the interleaved region. Four and six card bundles are also possible.

12 Claims, 16 Drawing Sheets

PIPETTE TIP SUPPORT CARD BUNDLES

CROSS-REFERENCE TO RELATED APPLICATIONS

This application claims priority to U.S. 63/614,919 filed on Dec. 26, 2023 entitled "Pipette Tip Support Card Bundles", and U.S. 63/567,766 filed on Mar. 20, 2024 entitled "Pipette Tip Support Card Bundles", the entire content of these applications is incorporated herein by reference.

This application is also related to U.S. Pat. No. 11,701,663 issued on Jul. 18, 2023, which is incorporated herein by reference in its entirety.

FIELD OF THE INVENTION

This invention relates to pipette tip systems, and more particularly support cards for the same.

BACKGROUND OF THE INVENTION

Current pipette tips systems have many drawbacks. First, the pipette tip is disposed in a support card, but is permitted to move significantly within the support card, ultimately rubbing against adjacent tips and building static electricity. This static can misalign the tips, making it more difficult, if not impossible, for a pipetter to accurately mate and seal with the pipette tip.

Second, the pipette tips are shipped in support cards that are individually wrapped and boxed with several of these individually wrapped support cards. During shipping the individual support cards can jostle against each other, and the pipette tips disposed within each support card and rub against each other, building static electricity. Again, this static misaligns the tips making it more difficult, if not impossible for a pipetter to accurately mate and seal with the pipette tip.

Third, an apron or a stand extends away from the support card to suspend the pipette tips above the laboratory bench surface. The apron enlarges the size of the support card, increasing shipping costs and waste.

What is needed, therefore, is a system that overcomes these problems.

SUMMARY OF THE INVENTION

Provided herein is an interleaved support card bundle comprised of two pipette tip support cards. Each of the support cards can be removed from the bundle and the pipette tips can be accessed. The interleaved support card bundle includes a first support card with a first top surface that contains a first plurality of pipette tip support holes. A first plurality of pipette tips is disposed in the first plurality of pipette tip support holes, and those tips extend away from the first top surface. The bundle also includes a second support card having a similar construction as that of the first support card. Specifically, the second support card includes a second top surface containing a second plurality of pipette tip support holes. A second plurality of pipette tips is disposed in the second plurality of pipette tip support holes, and those tips extend away from the second top surface. The first top surface is parallel to the second top surface, and the first plurality of pipette tips extends towards the second top surface. Likewise, the second plurality of pipette tips extends towards the first top surface. The pipette tips interleave with each other in the interleaved region.

The first and second support cards may have an apron, and may have a lid. The lid may fit over the top surface and may secure the plurality of pipette tips in its respective support holes. The lids may slide over the top surface, or may snap fit over the top surface. The edge of the either or both support cards may have a plurality of partial holes to prevent obstruction to a pipetter.

The interleaved support card bundle may be comprised of four or six support cards, all of similar construction, with their respective pipette tips interleaved.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF THE INVENTION

Figure 1A:
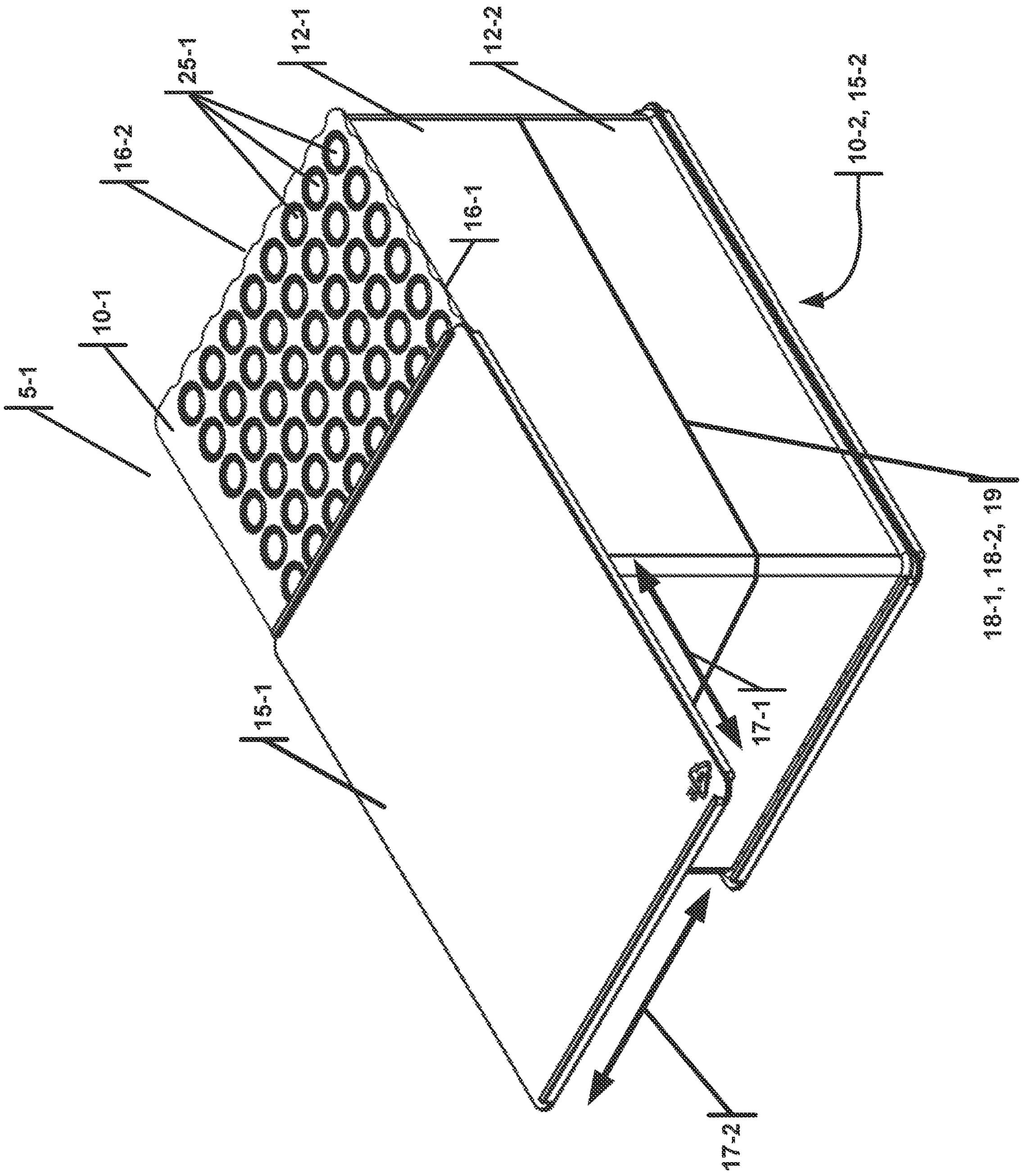
FIG. 1A is a top isometric view of an interleaved support card bundle comprised of two pipette tip support cards, with the covers partially opened to expose a plurality of pipette tips.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that they are not intended to limit the invention to the described or illustrated embodiments. To the contrary, they are intended to cover alternatives, modifications, and equivalents as may be included within the spirit and scope of the invention as defined by the appended claims.

In the following description, numerous specific details are set forth to provide a thorough understanding of the present invention. Example embodiments of the present invention may be implemented without some or all these specific details. In other instances, process operations well-known to persons of skill in the art have not been described in detail so as not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with the attached figures and is provided for ease of reference, where like reference numerals designate corresponding features throughout the specification and figures:

| | |
|---|---|
| Interleaved Support Card Bundle (Two Cards) | 5-1 |
| Interleaved Support Card Bundle (Four Cards) | 5-2 |
| Interleaved Support Card Bundle (Six Cards) | 5-3 |
| First Support Card | 10-1 |
| Second Support Card | 10-2 |
| Third Support Card | 10-3 |
| Fourth Support Card | 10-4 |
| Fifth Support Card | 10-5 |
| Sixth Support Card | 10-6 |
| First Apron | 12-1 |
| Second Apron | 12-2 |

-continued

| | |
|---|---|
| First Lid | 15-1 |
| Second Lid | 15-2 |
| Fourth Lid | 15-4 |
| Support Card Long Edge | 16-1 |
| Support Card Short Edge | 16-2 |
| Lid Sliding Direction (Long Edge) | 17-1 |
| Lid Sliding Direction (Short Edge) | 17-2 |
| First Apron Distal Edge | 18-1 |
| Second Apron Distal Edge | 18-2 |
| Apron Contact Area | 19 |
| First Top Surface | 20-1 |
| Second Top Surface | 20-2 |
| First Plurality of Pipette Tip Support Holes | 25-1 |
| Second Plurality of Pipette Tip Support Holes | 25-2 |
| First Plurality of Partial Holes | 35-1 |
| Multiport Pipetter | 40 |
| Unobstructed Region | 45 |
| First Plurality of Pipette Tips | 50-1 |
| Second Plurality of Pipette Tips | 50-2 |
| Pipette Tips Interleaved Region | 55 |
| Long Side Offset | 60-1 |
| Short Side Offse | 60-2 |
| Receiver Slot | 65-1 |
| Receiver Slot | 65-2 |

Now turning to the drawing, FIGS. 1A-1L illustrate an interleaved support card bundle 5-1 comprised of two pipette tip support cards (10-1, 10-2). Each of the support cards (10-1, 10-2) can be removed from the bundle 5-1 and the pipette tips can be accessed. The interleaved support card bundle 5-1 includes a first support card 10-1 with a first top surface 20-1 that contains a first plurality of pipette tip support holes 25-1. A first plurality of pipette tips 50-1 is disposed in the first plurality of pipette tip support holes 25-1, and those tips 50-1 extend away from the first top surface 20-1 (see FIG. 1E). The bundle 5-1 also has second support card with a similar construction as that of the first support card 10-1. Specifically, the second support card 10-2 includes a second top surface 20-2 containing a second plurality of pipette tip support holes 25-2. A second plurality of pipette tips 50-2 is disposed in the second plurality of pipette tip support holes 25-2, and those tips 50-2 extend away from the second top surface 20-2 (see FIG. 1E).

Figure 1B:
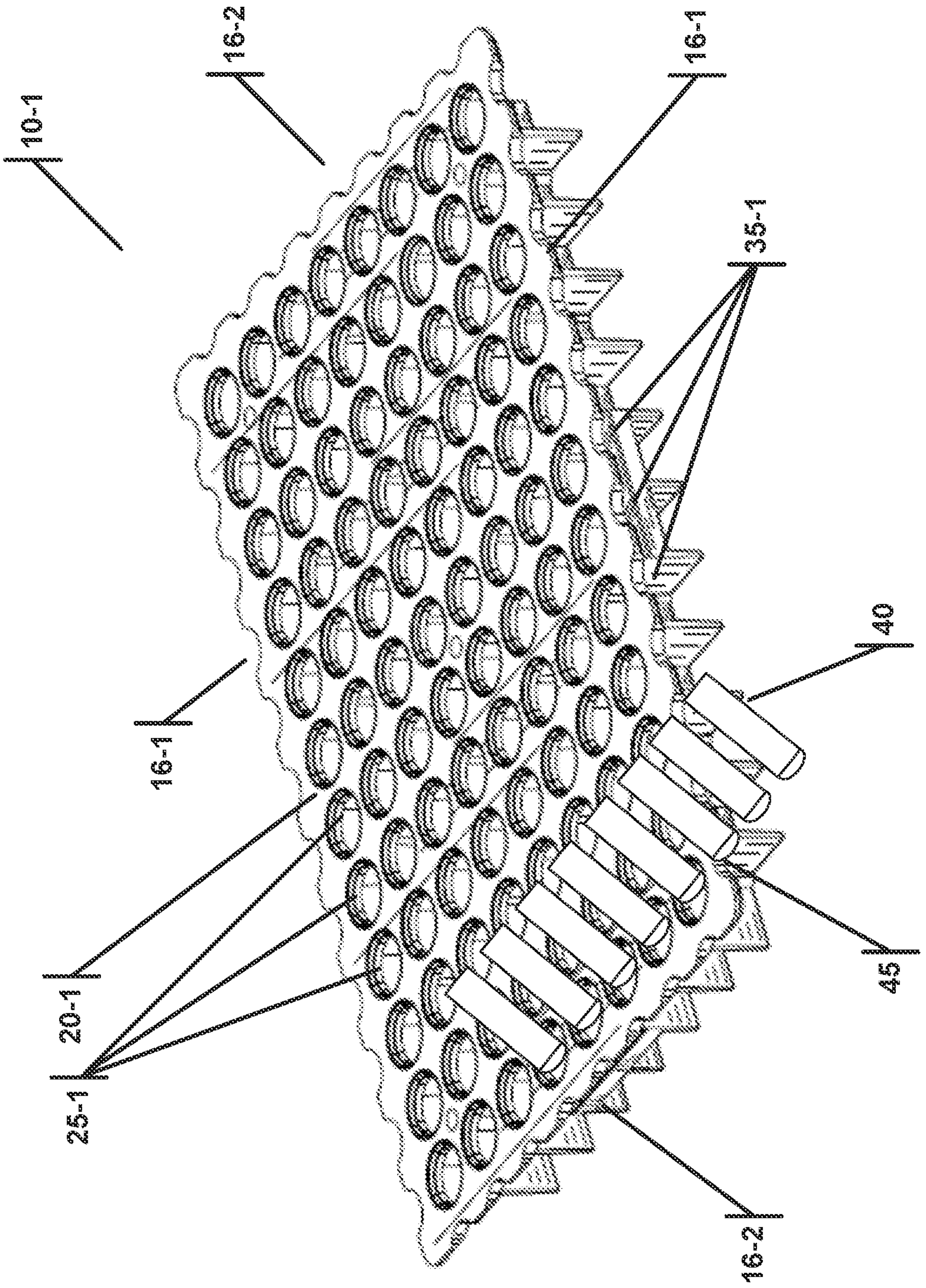
FIG. 1B is the pipette support card removed from the bundle illustrating the plurality of partial holes or cutouts along its edge, preventing interference with a multiport pipetter loading pipette tips.
Figure 1C:
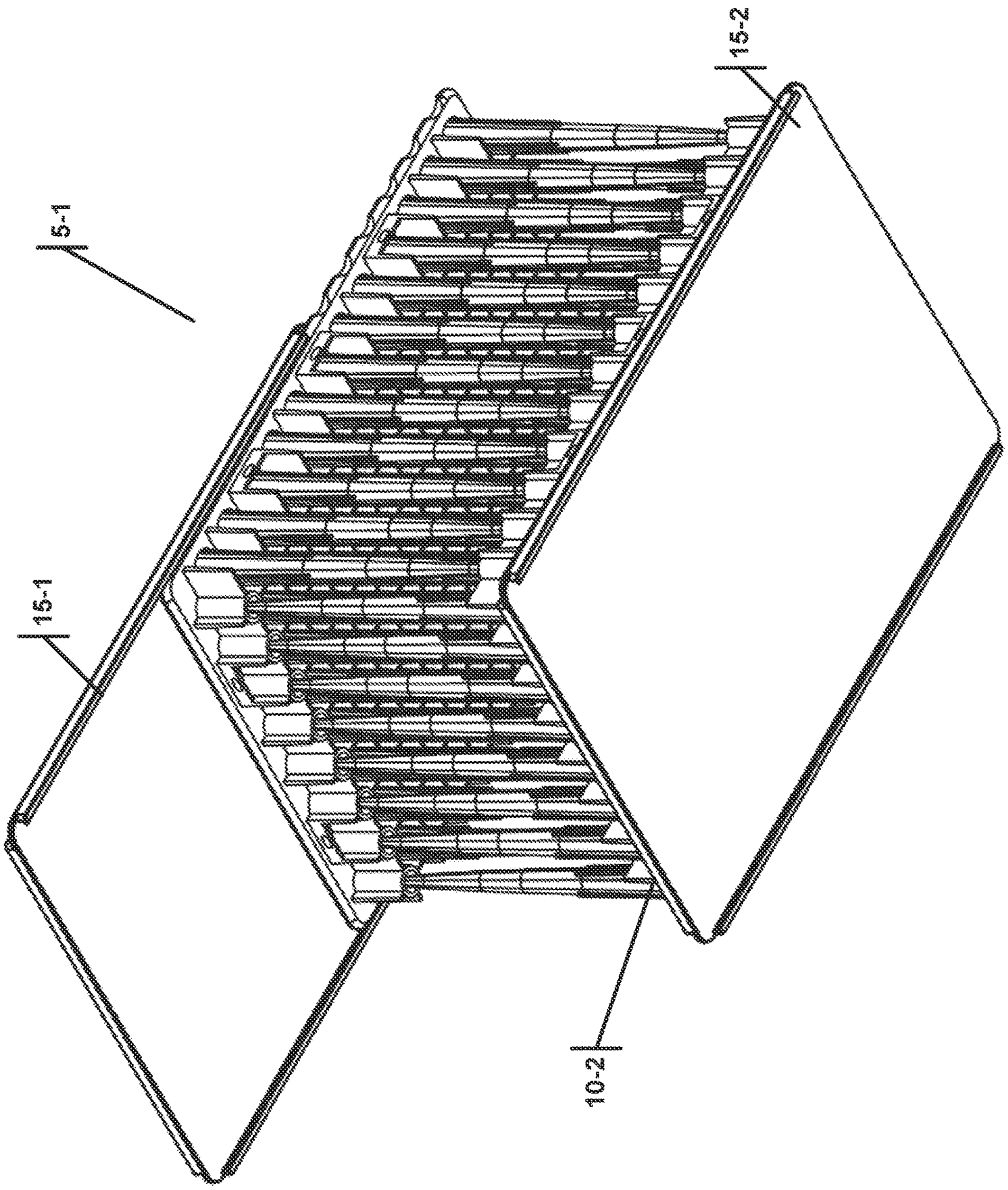
FIG. 1C is a bottom isometric view of an interleaved support card bundle comprised of two pipette tip support cards.
Figure 1D:
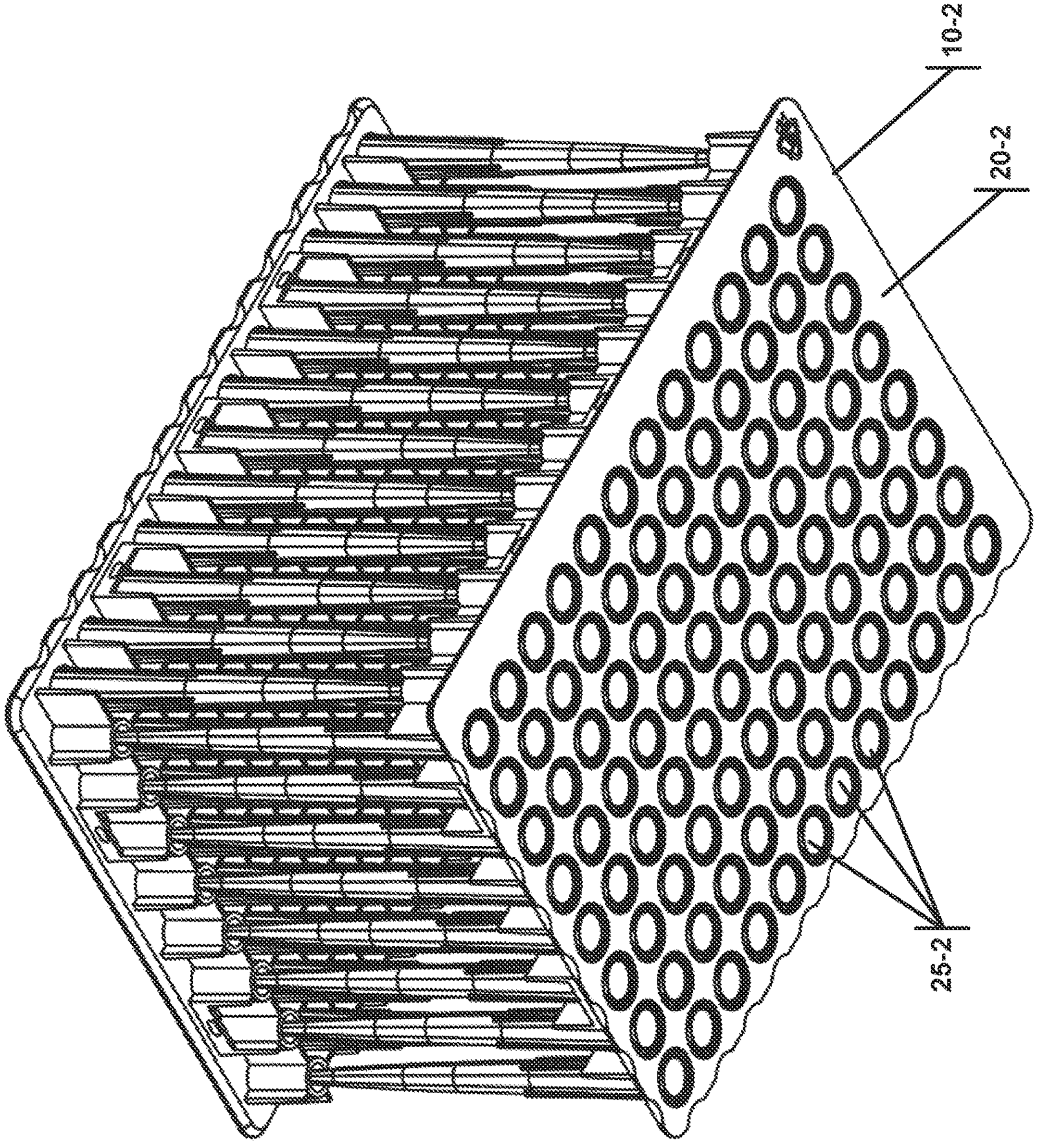
FIG. 1D is a bottom isometric view, with the aprons removed, of an interleaved support card bundle comprised of two pipette tip support cards, with the aprons removed.
Figure 1E:
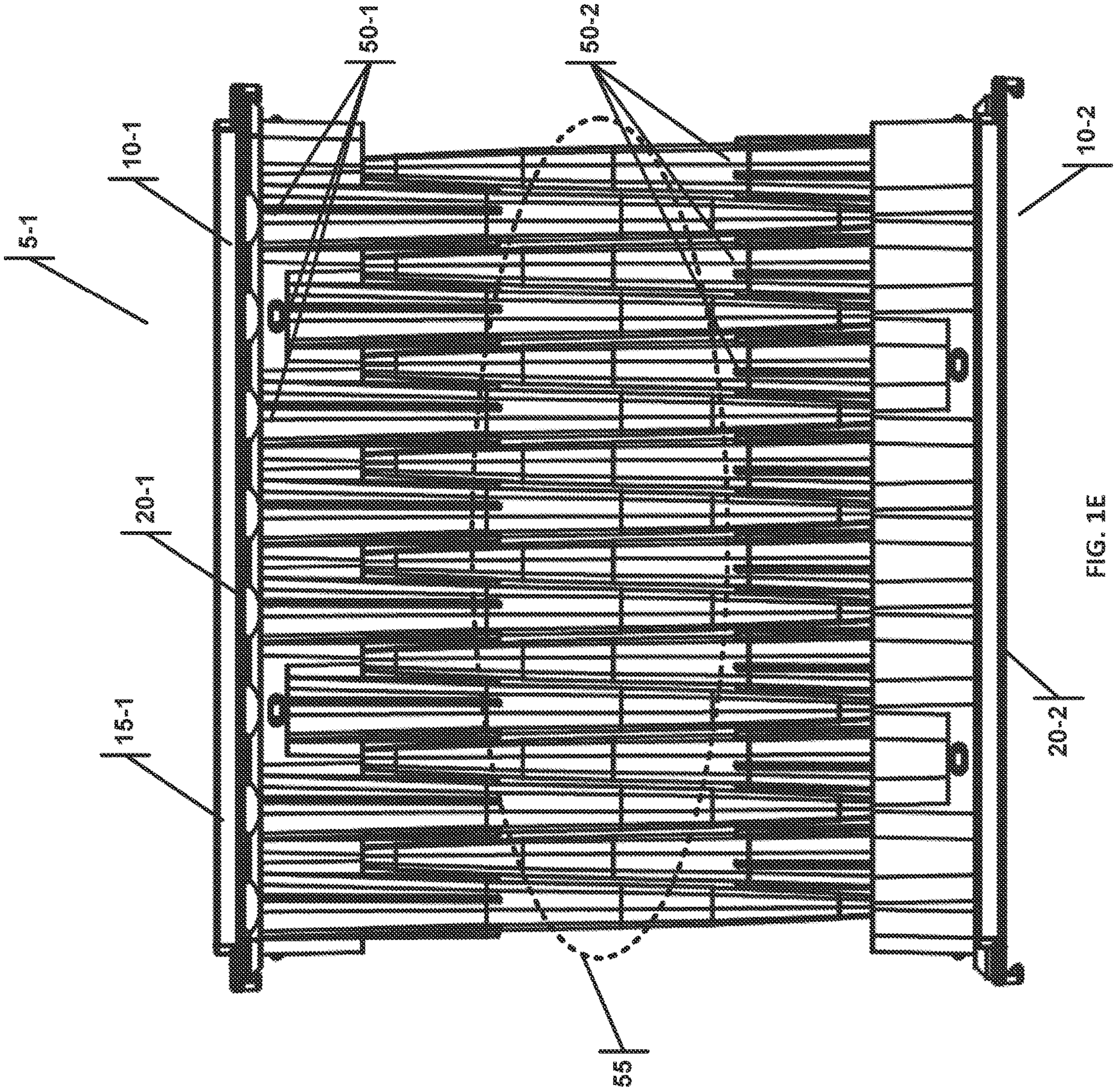
FIG. 1E is a short-side view, with the aprons removed, showing the interleaved pipette tips.
Figure 1F:
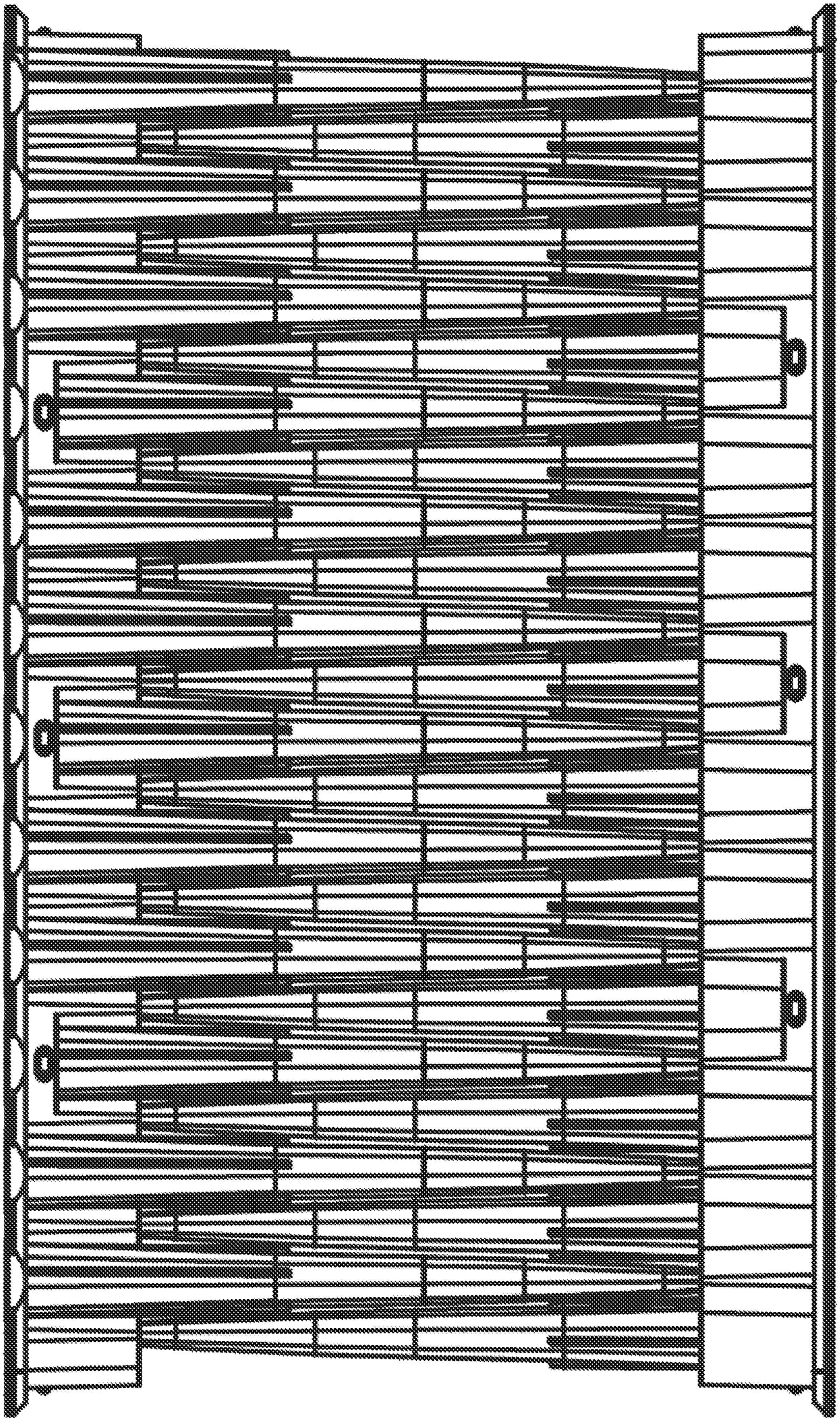
FIG. 1F is a long-side view, with the aprons removed, showing the interleaved pipette tips.
Figure 1G:
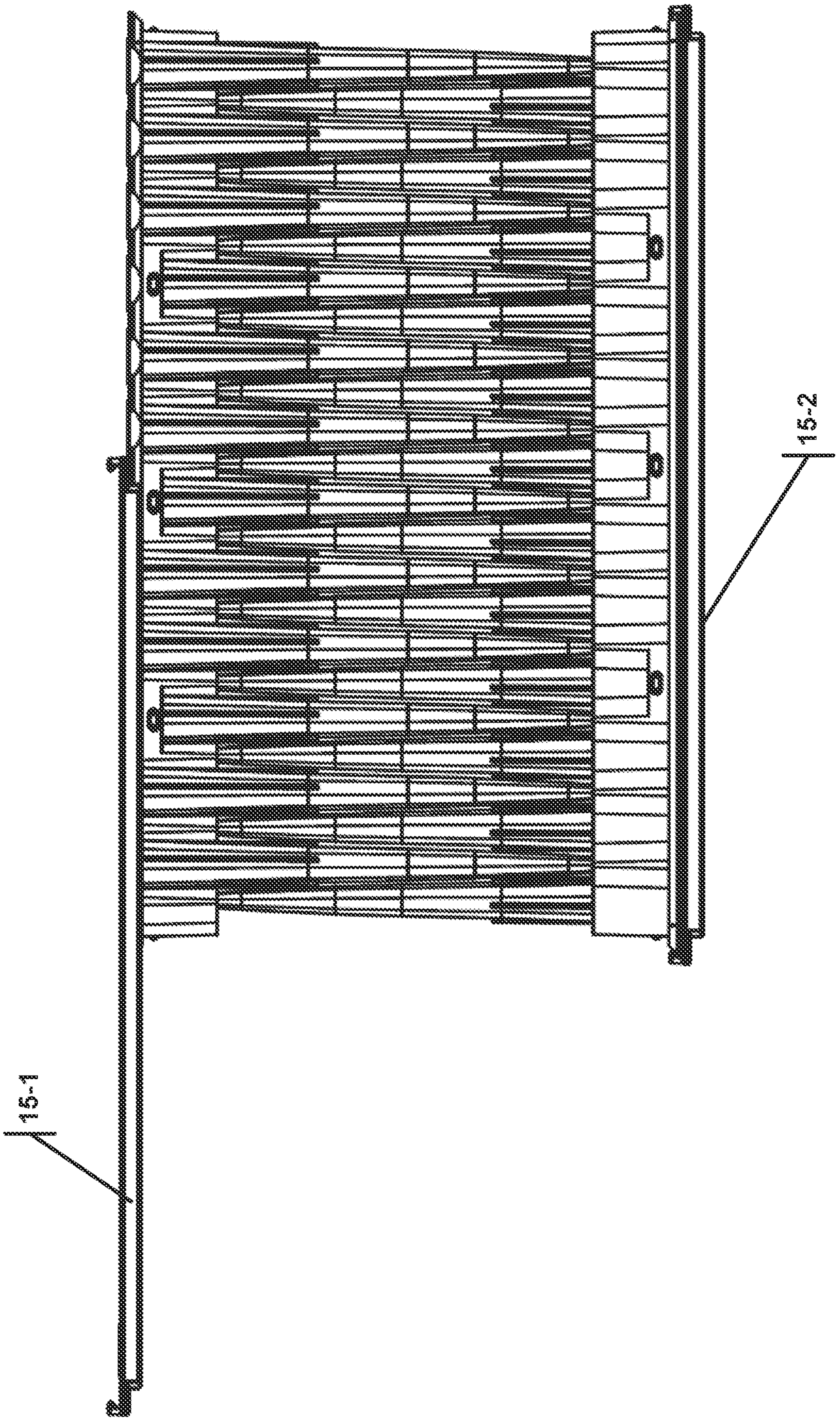
FIG. 1G is a long-side view, with the aprons removed, showing the interleaved pipette tips and a sliding lid.

FIG. 1E illustrates the relative positioning of the two support cards (10-1, 10-2). The first top surface 20-1 is parallel to the second top surface 20-2, and the first plurality of pipette tips 50-1 extends towards the second top surface 20-2. Likewise, the second plurality of pipette tips 50-2 extends towards the first top surface 20-1. The pipette tips (50-1, 50-2) interleave with each other in the interleaved region 55.

Figure 1I:
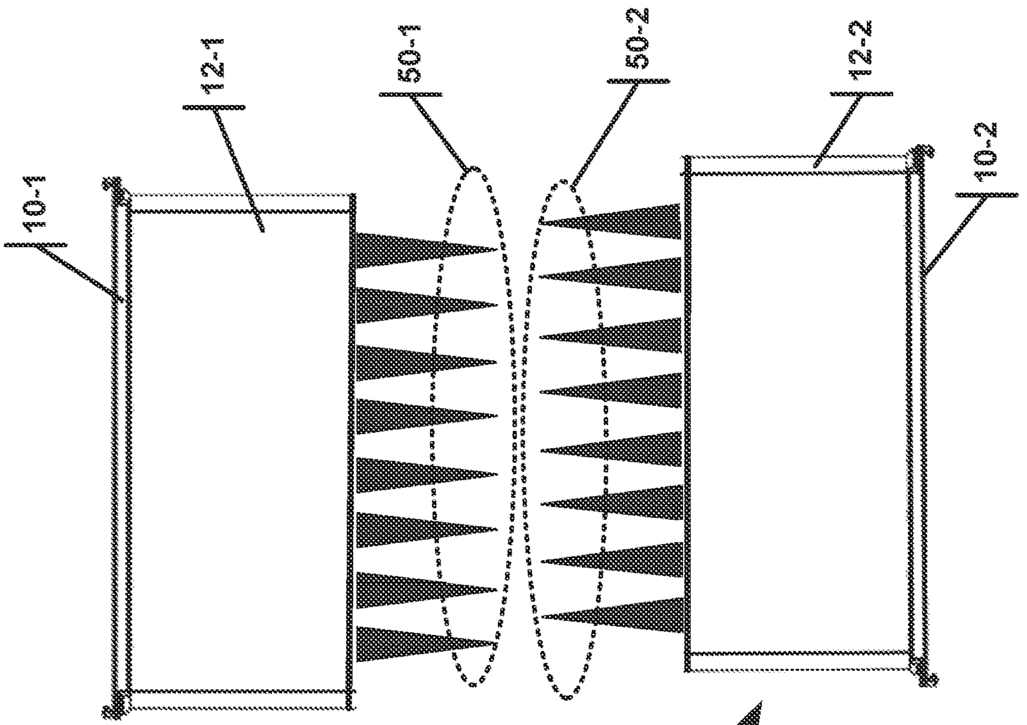
FIG. 1I is a front view of a separated interleaved support card bundle.
Figure 1H:
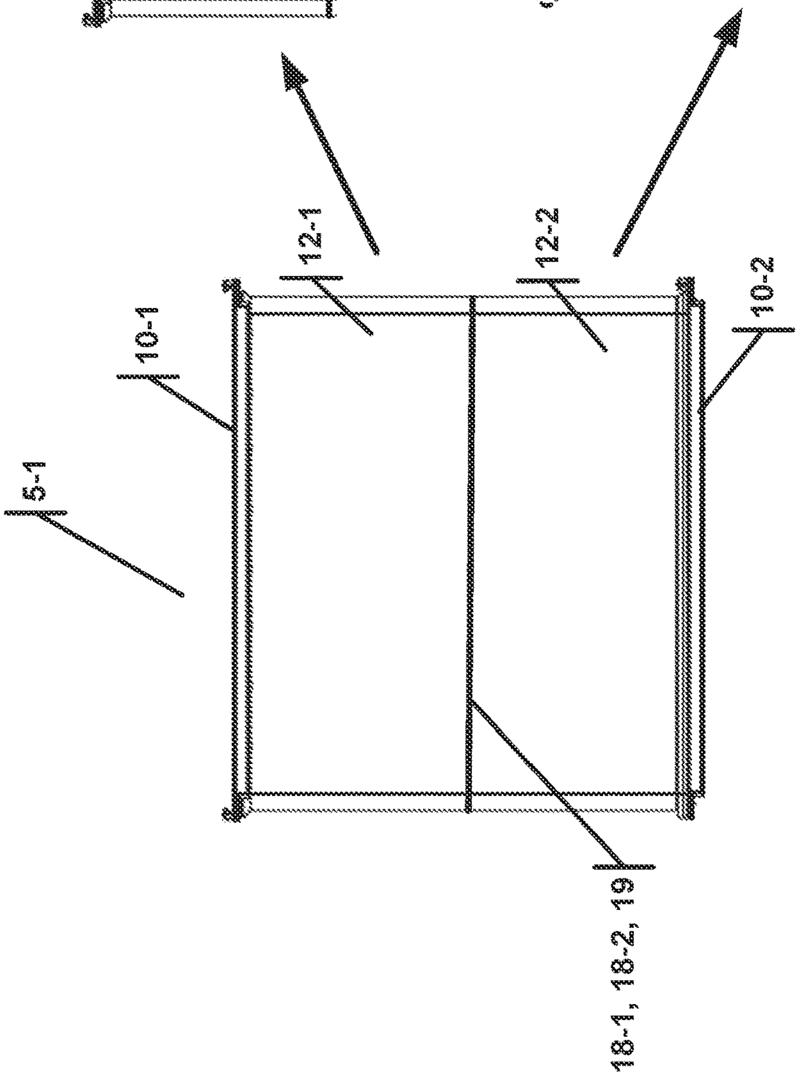
FIG. 1H is a front view of an interleaved support card bundle comprised of two pipette tip support cards.

FIG. 1H illustrates a first apron 12-1 connected to the first support card 10-1 and extending away from the first top surface 20-1, and a second apron 12-2 connected to the second support card 10-2 and extending away from the second top surface 20-2. The first apron distal edge 18-1 contacts the second apron distal edge 18-2 as the apron contact area 19. The support card aprons can be separated from each other and can support their respective pipette support cards as shown in FIG. 1I. Alternatively, the support cards cannot be separated, and to access the bottom side pipette tips, the bundle 5-1 is simply turned over. Specifically, the support card bundle (5-1) may be positioned such that the first top surface (20-1) is horizontal and above the second top surface (20-2), then one or more pipette tips from the first plurality of pipette tips (50-1) may be access by an aspiration device. If more pipette tips are needed, then the support card bundle (5-1) may be rotated such that the second top surface (20-2) is horizontal and above the first top surface (20-1), allowing access to one or more pipette tips from the second plurality of pipette tips (50-2) by an aspiration device. If the support cards have lids (discussed below), the lid for the first support card (10-1) is opened to expose and access the first plurality of pipette tips (50-1). The lid for the second support card (10-2) may be closed while the first plurality of pipette tips (50-1) is accessed to prevent the second plurality of pipette tips (50-2) from dislodging from its respective card. Before the bundle is rotated to access the second support card (10-2), the lid for the first support card (10-1) may be closed if there are still pipette tips in the first plurality of pipette tips (50-1). Then the lid for the second support card (10-2) may be opened to access the second plurality of pipette tips (50-2). If the bundle has four or six support cards (describe below), then the lids for the non-accessed support cards can be maintained closed, again to prevent the plurality of pipette tips from dislodging from its respective card. The aspiration device may be a handheld pipetter (single or multiport), an automated pipetter (single or multiport) or a pump.

The distance the first apron 12-1 extends away from the first top surface 20-1 is less than the distance the first plurality of pipette tips 50-1 extends away from the first top surface 20-1; thus, the first plurality of pipette tips 50-1 extend past the first apron distal edge 18-1. The second apron 12-2 has a similar construction to that of the first apron 12-1 as shown in FIG. 1I.

The first support card 10-1 may have a first lid 15-1 constructed cover the first top surface 20-1 and secure the first plurality of pipette tips 50-1 in its respective support holes 25-1. The first lid 15-1 may slide over the first top surface 20-1 as shown in FIG. 1A. The first support card 10-1 may have a long edge 16-1 and a short edge 16-2. The first lid 15-1 may slide along the long edge 17-1 or along the short edge 17-2. The support card covers may be connected to the support card as described in U.S. Pat. No. 11,701,663 issued on Jul. 18, 2023, which is incorporated herein by reference in its entirety. The first lid may instead be a snap-fit lid, or may connect to the support card via a hinge. The second support card 10-2 may have a second lid 15-2 with a similar construction to that of the first lid 15-1 as shown in FIGS. 1A and 1C.

FIG. 1B is the pipette support card 10-1 removed from the bundle illustrating a plurality of partial holes or cutouts 35-1 along its long edge 16-1 (the support card 10-1 is illustrated with cutouts along all four edges). These cutouts prevent interference with a multiport pipetter 40. If, for example, a multiport pipetter 40 is only accessing five of the pipette tips as shown in FIG. 1B, then three of the multiport pipetter 40 ports must travel along the outer edge of the support card 10-1. The cutouts 35-1 creates an unobstructed region 45 that allows the multiport pipetter 40 to travel along the edge without interference. Without these cutouts 35-1 along the edge, the multiport pipetter 40 would be blocked from accessing the five pipette tips. The second support card 10-2 may also have a plurality of cutouts of similar construction.

Figure 1J:
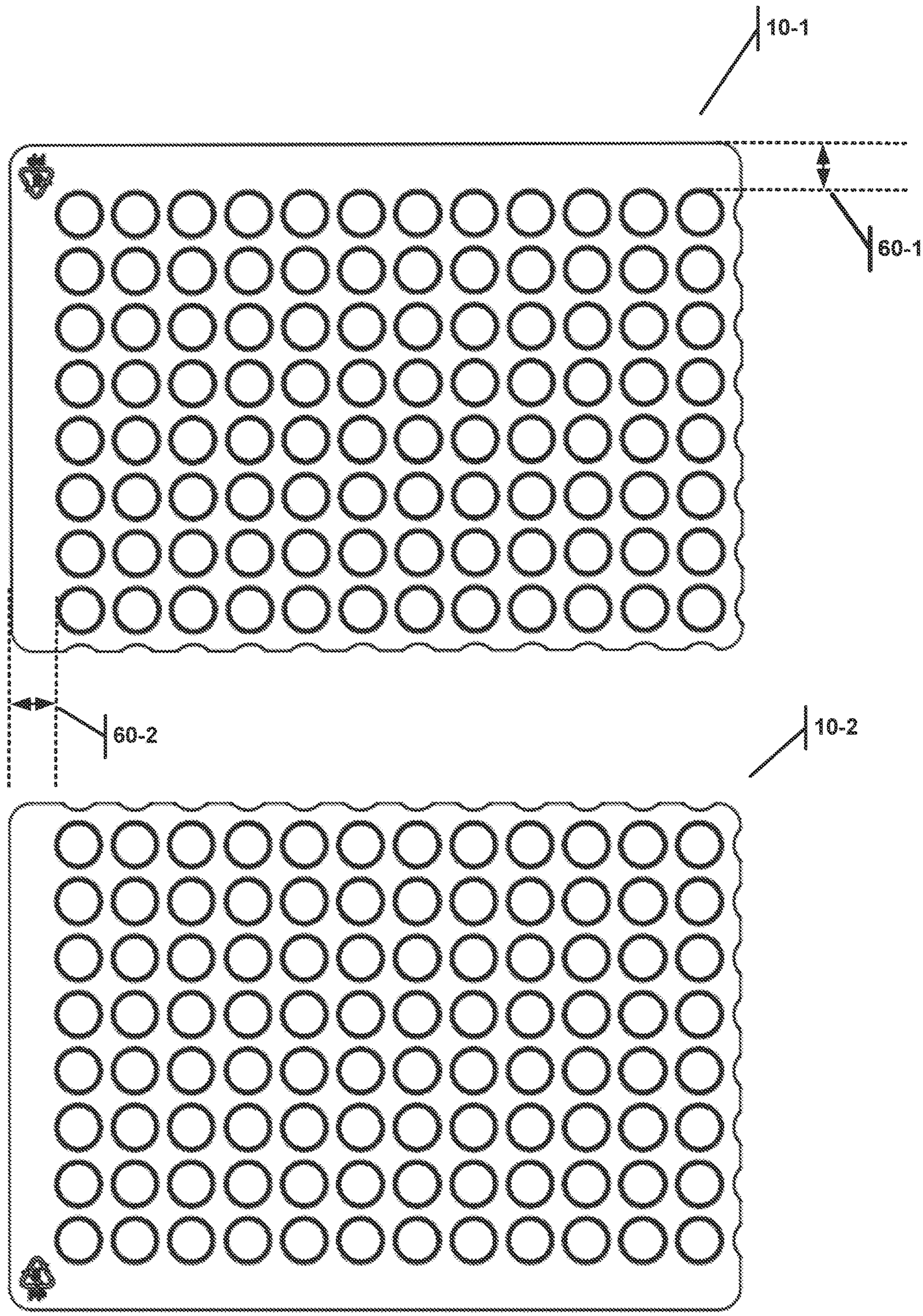
FIG. 1J is a top view of the support cards, showing the offset.
Figure 1K:
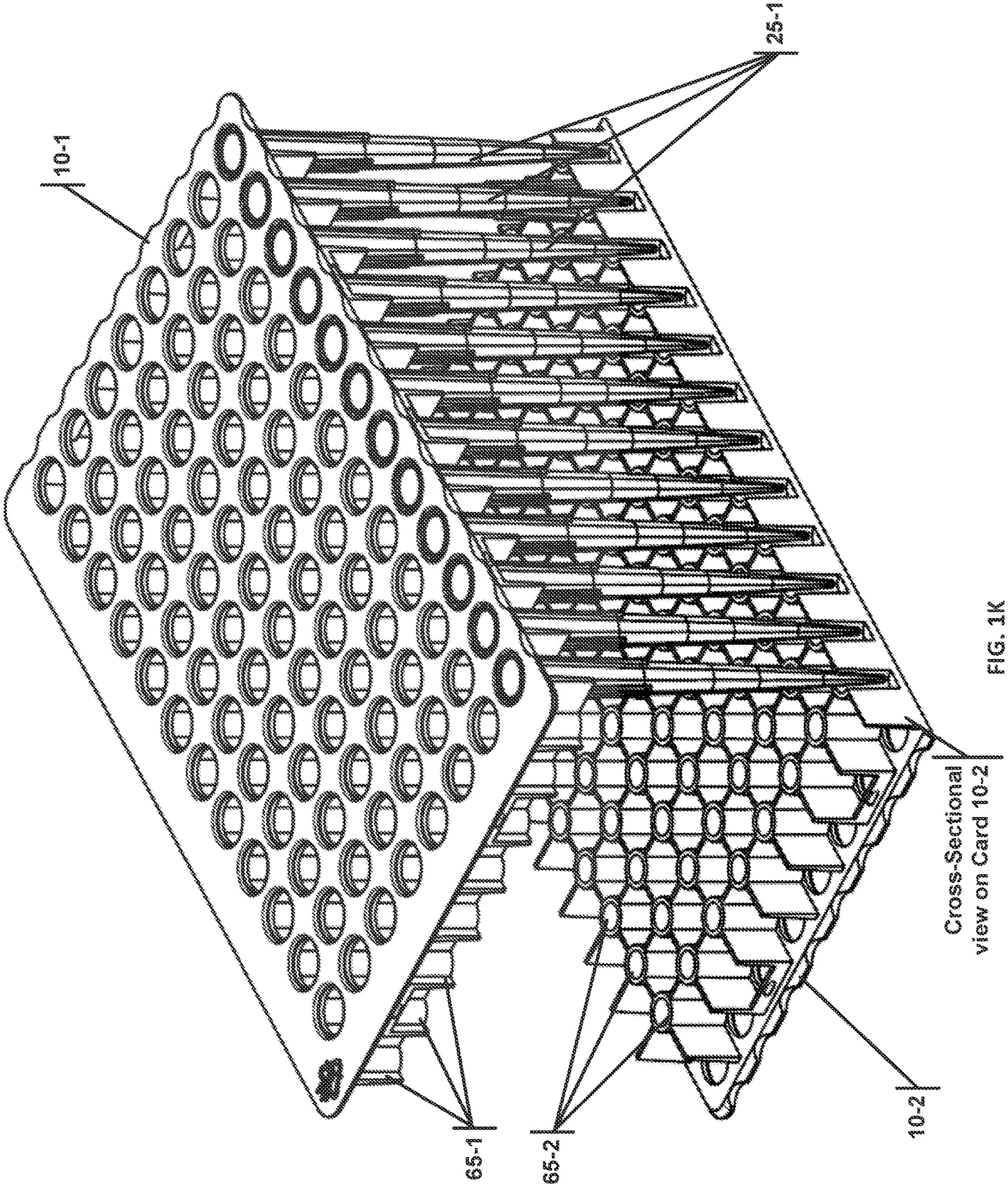
FIG. 1K is a top isometric view, with the apron removed, showing the pipette tips disposed in the underside receiver slots.
Figure 1L:
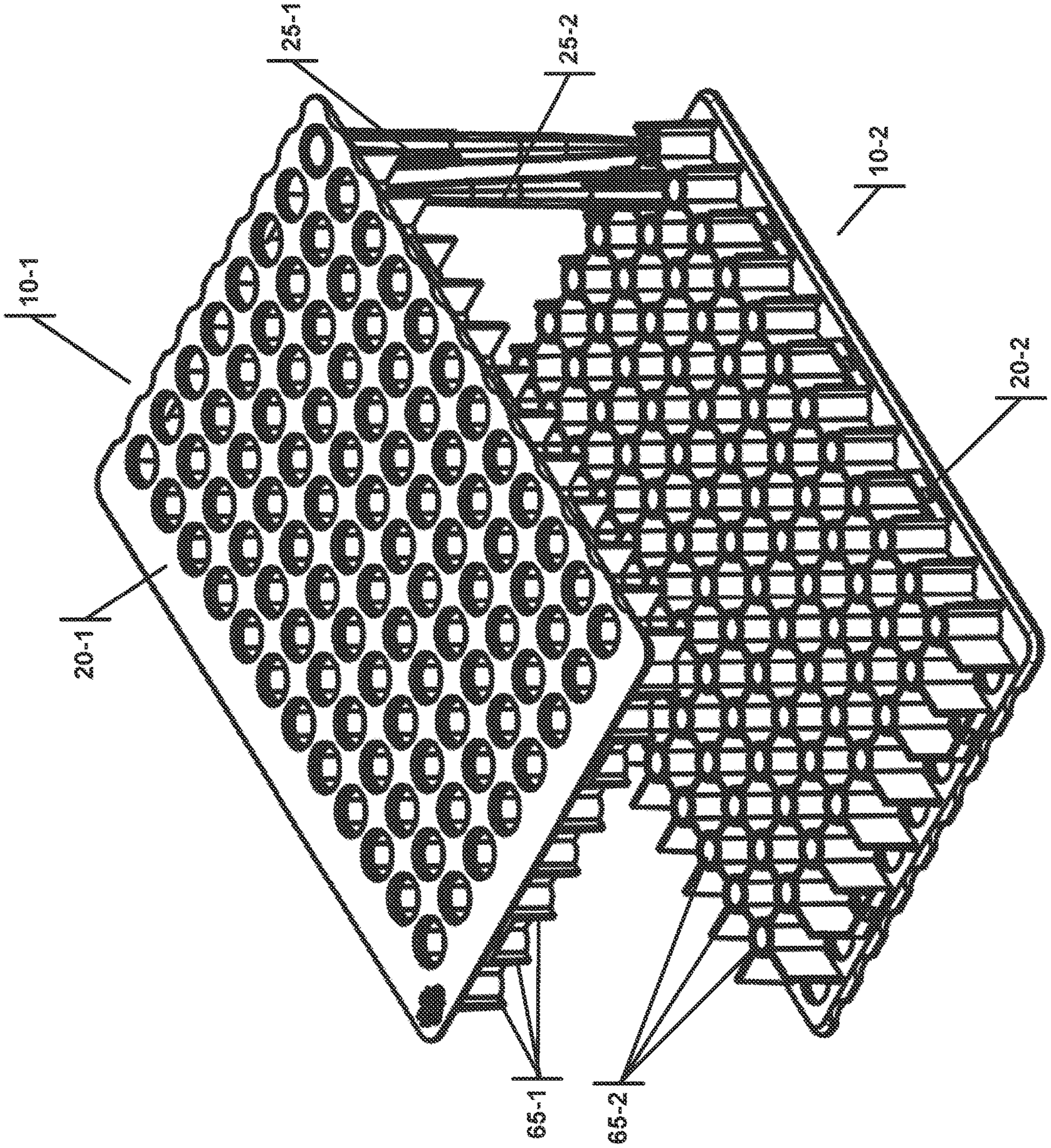
FIG. 1L is a top isometric view, with the apron removed, showing the pipette tips disposed in the underside receiver slots.

FIG. 1J illustrates the first support card 10-1 with a long-side offset 60-1 and a short-side offset 60-2. The second support card 10-2 is a similar construction, but a mirror image to the first support card 10-1. The offsets (60-1, 60-2) assist in staggering the pipette tips from opposing support cards so they do not interfere with each other. FIG. 1K illustrates this staggering and details the underside receiver slot 65-1 on support card 10-1. The receiver slot 65-1 receives the distal end of the pipette tip from the opposing support card. This is shown in greater detail in FIG. 1K, where the receiver slots 65-2 of the second support card 10-2 are shown in cross-section. FIG. 1L illustrates two pipette tips from opposing support cards disposed in the underside receiver slots. The receiver slots 65-1 prevent the pipette tips from contacting each other during shipping and handling, and thus reduce the buildup of static electricity—this in turn keeps the pipette tips centered in the pipette tip support holes. This is particularly important for automatic pipette machines which load the pipette tips by placing the pipetter centered on the support hole. Deviations from center can prevent the pipette tip from being properly loaded and thus affect the operation of the system.

Figure 2A:
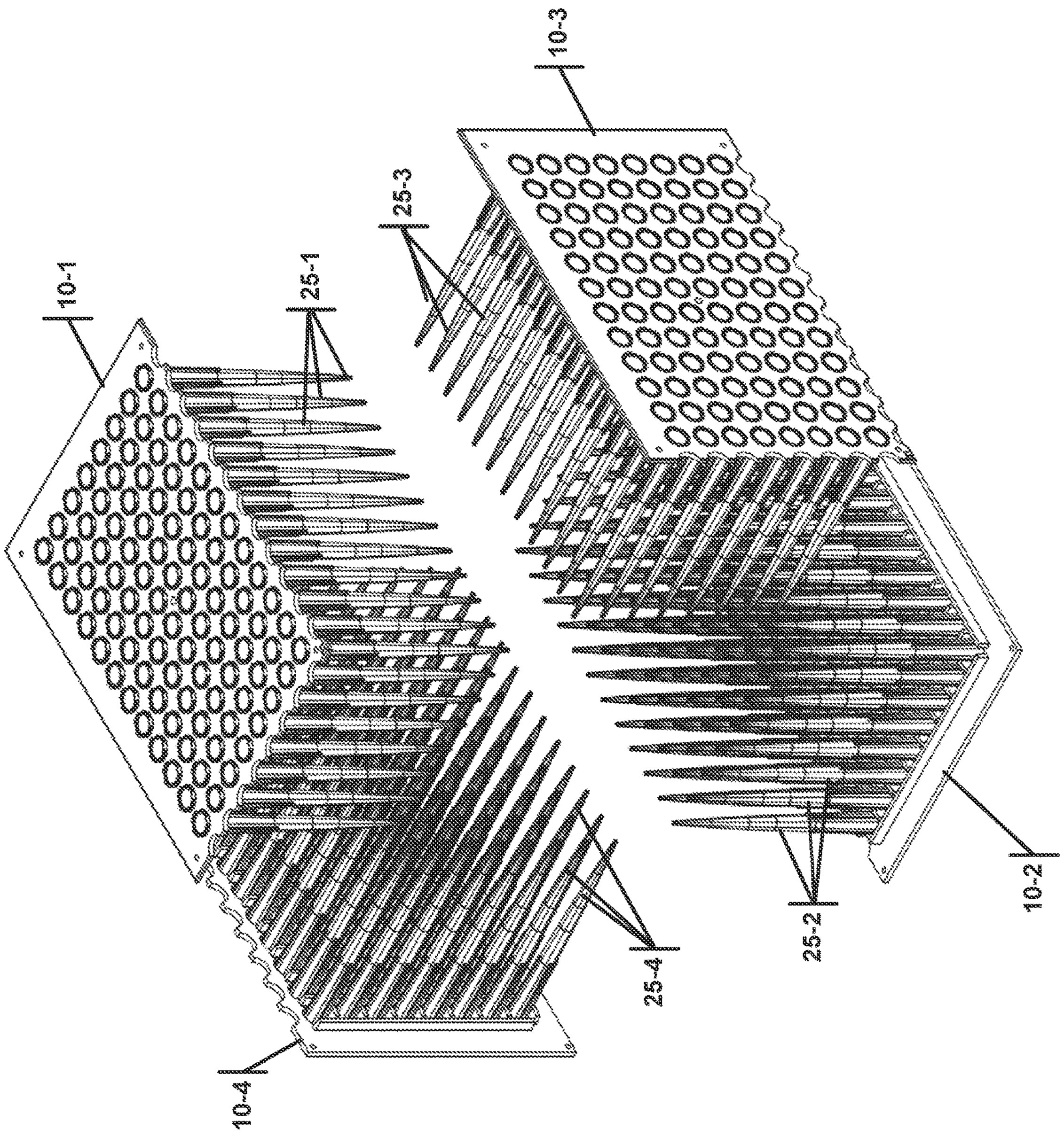
FIG. 2A is a top perspective exploded view of an interleaved support card bundle comprised of four pipette tip support cards.
Figure 2B:
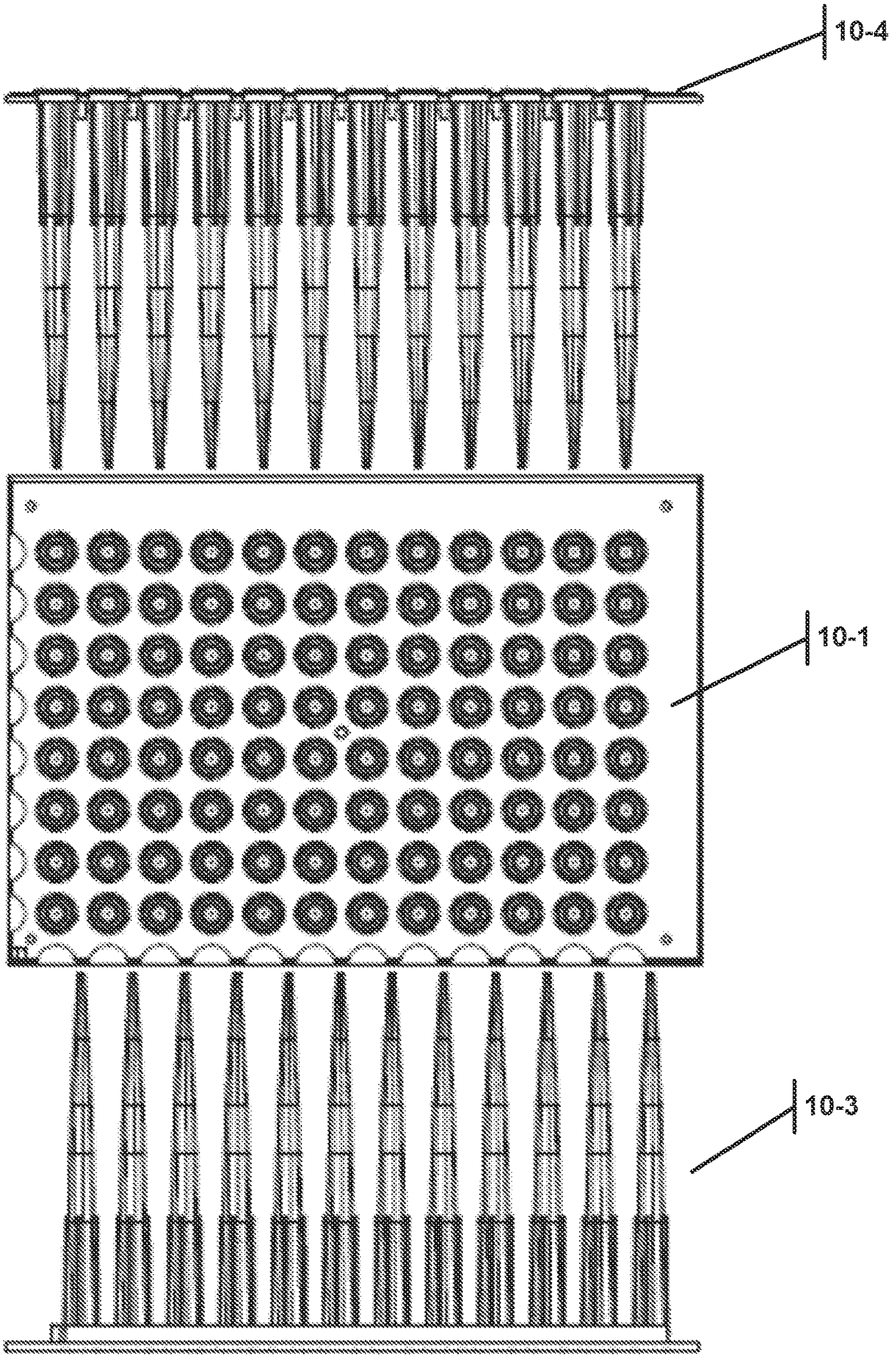
FIG. 2B is a top exploded view of an interleaved support card bundle comprised of four pipette tip support cards.
Figure 2C:
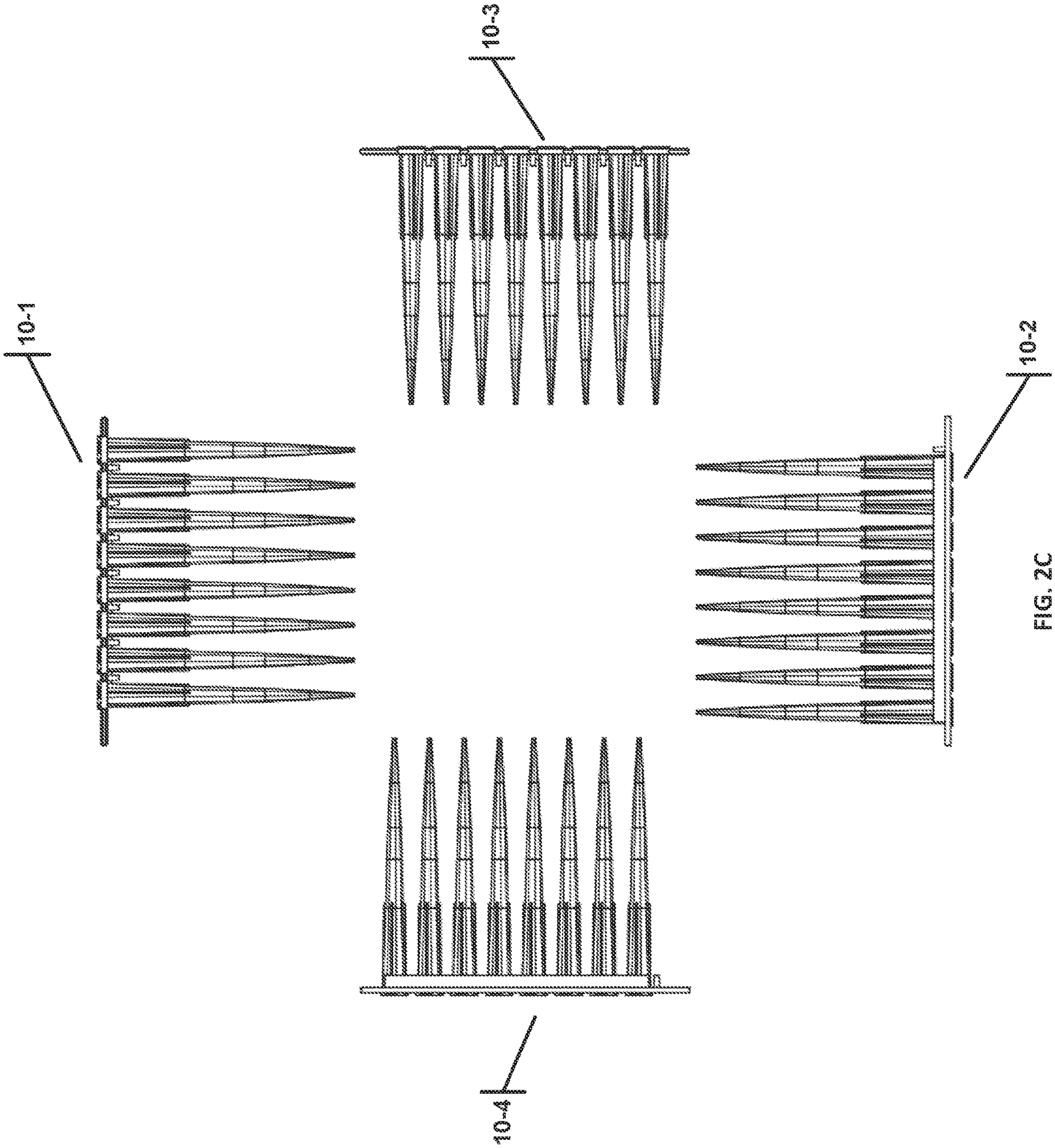
FIG. 2C is a short-side exploded view of an interleaved support card bundle comprised of four pipette tip support cards.

FIGS. 2A through 2C illustrate an interleaved support card bundle 5-2 comprised of four pipette tip support cards (10-1, 10-2, 10-3, 10-4). The additional third support card 10-3 and fourth support card 10-4 is of a similar construction to that of the first support card 10-1 already discussed. In this configuration, the top surface of the third support card 10-3 is parallel to the top surface of the fourth support card 10-4. Also, the top surface of the third support card 10-3 is orthogonal to the first top surface 20-1. The plurality of pipette tips supported by the third support card 10-3 extends towards the top surface of the fourth support card 10-4. Likewise, the plurality of pipette tips supported by the fourth support card 10-4 extends towards the top surface of the third support card 10-3. These pipette tips are interleaved with each other. A user can access the pipette tips by rotating the bundle 5-2 to the desired support card and exposing the pipette tips on that support card. Once the pipette tips from that support card have been exhausted, the user can access more pipette tips by rotating the bundle 5-2 to a support card with available pipette tips.

Figure 3A:
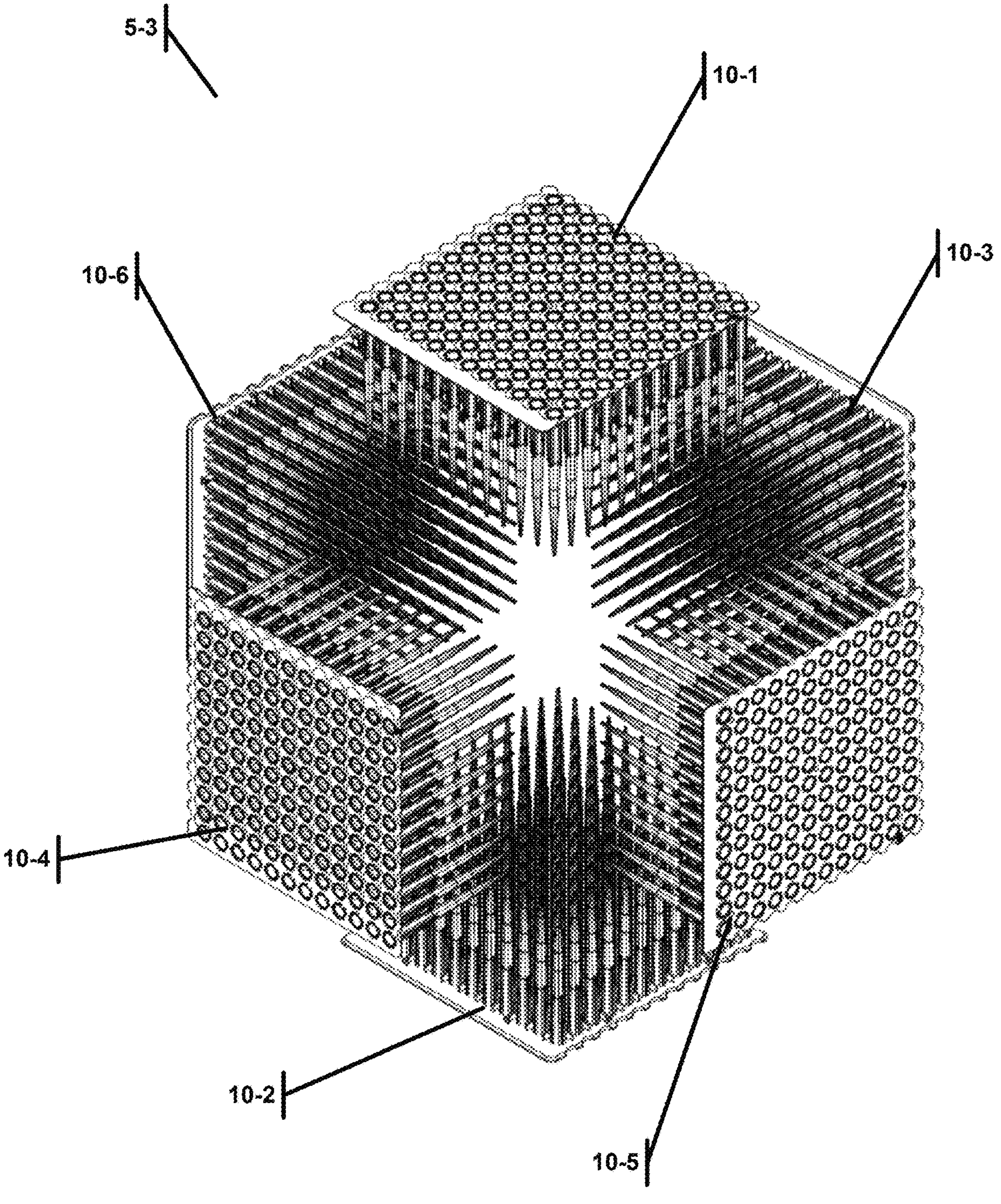
FIG. 3A is a top isometric exploded view of an interleaved support card bundle comprised of six pipette tip support cards.
Figure 3B:
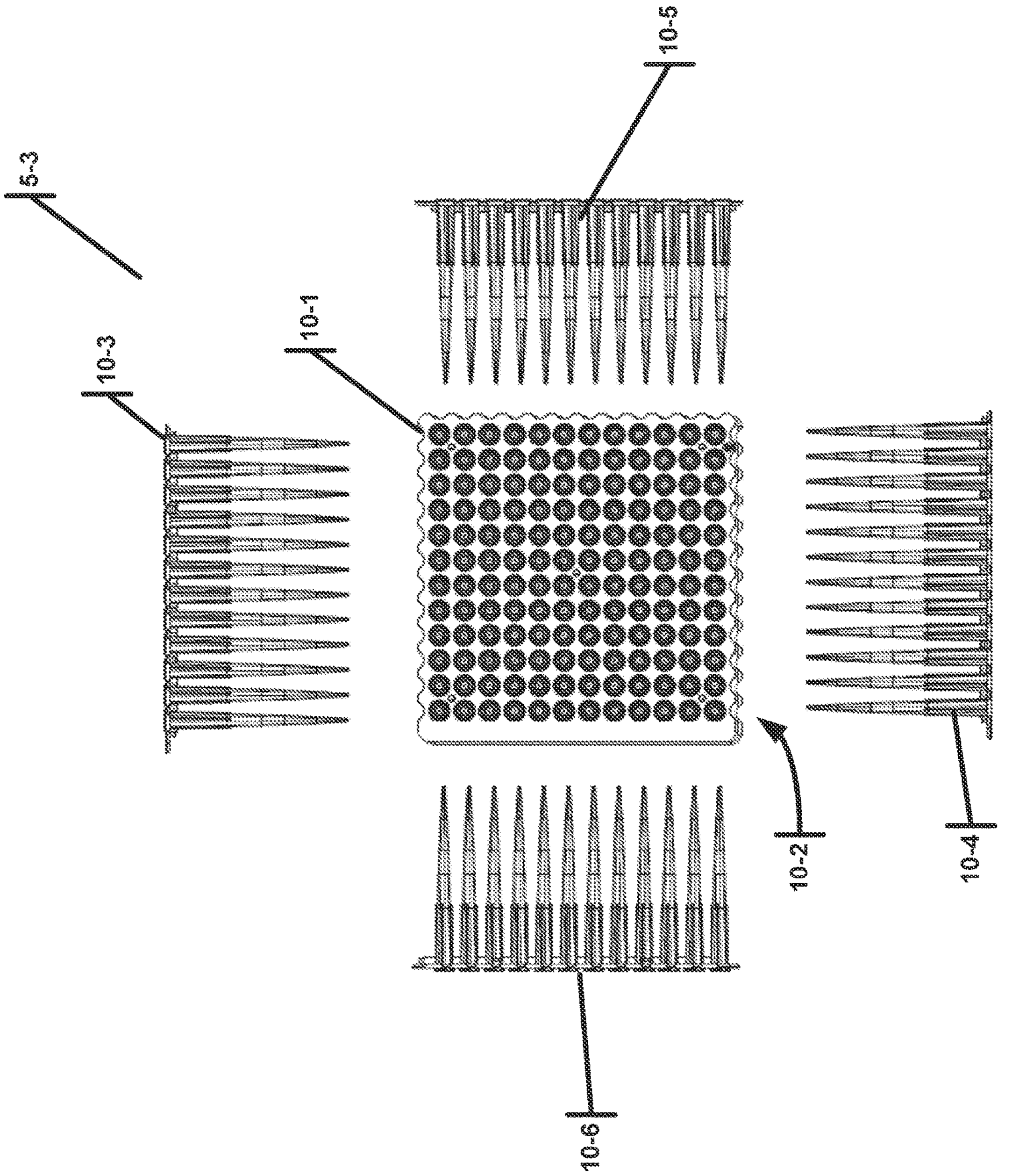
FIG. 3B is a top exploded view of an interleaved support card bundle comprised of six pipette tip support cards.

FIGS. 3A and 3B illustrate an interleaved support card bundle 5-3 comprised of six pipette tip support cards (10-1, 10-2, 10-3, 10-4, 10-5, 10-6). The additional fifth support card 10-5 and sixth support card 10-6 is of a similar construction to that of the first support card 10-1 already discussed. In this configuration, the top surface of the fifth support card 10-5 is parallel to the top surface of the sixth support card 10-6. Also, the top surface of the fifth support card 10-5 is orthogonal to the first top surface 20-1. The plurality of pipette tips supported by the fifth support card 10-5 extends towards the top surface of the sixth support card 10-6. Likewise, the plurality of pipette tips supported by the sixth support card 10-6 extends towards the top surface of the fifth support card 10-5. These pipette tips are interleaved with each other. A user can access the pipette tips by rotating the bundle 5-3 to the desired support card and exposing the pipette tips on that support card. Once the pipette tips from that support card have been exhausted, the user can access more pipette tips by rotating the bundle 5-3 to a support card with available pipette tips.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art, and that the scope of the present invention is accordingly limited by nothing other than the appended claims.

The invention claimed is:

1. An interleaved support card bundle comprising, a first support card comprising:

a first top surface containing a first plurality of pipette tip support holes in a first layout;

a plurality of receiver slots on an underside of the first top surface, each receiver slot having a receiver slot wall and a receiver slot axis extending orthogonally away from the first top surface; and a first plurality of pipette tips seated in the first plurality of pipette tip support holes, each of the first plurality of pipette tips having a distal end;

a first apron connected to the first support card and extending from the first top surface;

a second support card comprising:

a second top surface parallel to the first top surface, and containing a second plurality of pipette tip support holes in a layout different than the first layout, each in the second plurality of pipette tip support holes defines a pipette tip support hole axis that is aligned with a corresponding receiver slot axis of the plurality of receiver slots; and a second plurality of pipette tips seated in the second plurality of pipette tip support holes, each of the second plurality of pipette tips having a distal end;

a second apron connected to the second support card and extending from the second top surface;

wherein:

the first apron is detachably connected to the second apron such that the first and second support cards are structurally connected as a single bundle;

the first plurality of pipette tips extends towards the second top surface and the second plurality of pipette tips extends towards the first top surface, and is interleaved with the first plurality of pipette tips; and the receiver slot walls of the plurality of receiver slots are sized and shaped to encircle the distal ends of the second plurality of pipette tips, restrict movement of the second plurality of pipette tips, and prevent the second plurality of pipette tips from contacting the first plurality of pipette tips.

2. The interleaved support card bundle of claim 1, wherein each apron has a distal edge, and the distal edge of the first apron contacts the distal edge of the second apron.

3. The interleaved support card bundle of claim 1, wherein the first support card is fixed to the second support card.

4. The interleaved support card bundle of claim 1, wherein the first support card is detachably attached to the second support card.

5. The interleaved support card bundle of claim 1, wherein the second support card comprises a plurality of receiver slots on an underside of the second top surface; and the distal ends of the first plurality of pipette tips are disposed in the plurality of receiver slots on the underside of the second top surface.

6. The interleaved support card bundle of claim 1, wherein:

the first top surface comprises a first pair of parallel edges; and the first plurality of pipette tip support holes is positioned closer to one of the first pair parallel edges than the other edge of the first pair of parallel edges.

7. The interleaved support card bundle of claim 6, wherein:

the first top surface comprises a second pair of parallel edges that are orthogonal to the first pair of parallel edges; and the first plurality of pipette tip support holes is positioned closer to one of the second pair parallel edges than the other edge of the second pair of parallel edges.

8. The interleaved support card bundle of claim 1, further comprising:

a first lid connected to the first support card and positioned to cover the first top surface to maintain the first plurality of pipette tips in the first plurality of pipette tip support holes; and a second lid connected to the second support card and positioned to cover the second top surface to maintain the second plurality of pipette tips in the second plurality of pipette tip support holes.

9. The interleaved support card bundle of claim 1, further comprising:

a first plurality of repeating cutouts forming at least one edge of the first top surface; and a second plurality of repeating cutouts forming at least one edge of the second top surface.

10. A method of accessing pipette tips from an interleaved support card bundle of claim 1, the method comprising:

positioning the support card bundle such that the first top surface is horizontal and above the second top surface;

mating and sealing a multi-port or single-port aspiration device with one or more pipette tips from the first plurality of pipette tips;

rotating the support card bundle such that the second top surface is horizontal and above the first top surface;

contacting with an aspiration device one or more pipette tips from the second plurality of pipette tips.

11. A method of accessing pipette tips from an interleaved support card bundle of claim 8, the method comprising:

positioning the support card bundle such that the first top surface is horizontal and above the second top surface;

opening the first lid to expose the first plurality of pipette tips;

mating and sealing a multi-port or single-port aspiration device with one or more pipette tips from the first plurality of pipette tips;

rotating the support card bundle such that the second top surface is horizontal and above the first top surface;

opening the second lid to expose the second plurality of pipette tips;

contacting with an aspiration device one or more pipette tips from the second plurality of pipette tips.

12. The method of claim 11, wherein the aspiration device is a handheld pipetter, or an automated pipetter.

* * * * *